United States Patent
Dutilly et al.

(10) Patent No.: US 10,272,342 B2
(45) Date of Patent: *Apr. 30, 2019

(54) LOCATION BASED REWARD DISTRIBUTION SYSTEM

(71) Applicant: Disney Enterprises, Inc., Burbank, CA (US)

(72) Inventors: Derek Dutilly, Valencia, CA (US); Michael Jacob, Glendale, CA (US); Greg McBride, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,928

(22) Filed: Aug. 16, 2017

(65) Prior Publication Data

US 2018/0015371 A1    Jan. 18, 2018

Related U.S. Application Data

(63) Continuation of application No. 12/623,115, filed on Nov. 20, 2009, now Pat. No. 9,744,462.

(51) Int. Cl.
*A63F 9/00* (2006.01)
*A63F 13/69* (2014.01)
*A63F 13/79* (2014.01)
*A63F 13/327* (2014.01)

(52) U.S. Cl.
CPC ............ *A63F 13/69* (2014.09); *A63F 13/327* (2014.09); *A63F 13/79* (2014.09); *A63F 2300/205* (2013.01); *A63F 2300/609* (2013.01)

(58) Field of Classification Search
None
See application file for complete search history.

(56) References Cited

U.S. PATENT DOCUMENTS

| | | |
|---|---|---|
| 5,752,880 A | 5/1998 | Gabai |
| 5,971,855 A | 10/1999 | Ng |
| 6,022,273 A | 2/2000 | Gabai |
| 6,075,195 A | 6/2000 | Gabai |
| 6,773,344 B1 | 8/2004 | Gabai |
| 6,877,096 B1 | 4/2005 | Chung |
| 7,445,550 B2 | 11/2008 | Barney |
| 7,488,231 B2 | 2/2009 | Weston |
| 7,500,917 B2 | 3/2009 | Barney |
| 7,674,184 B2 | 3/2010 | Briggs |
| 7,749,089 B1 | 7/2010 | Briggs |
| 7,850,527 B2 | 12/2010 | Barney |
| 2002/0077180 A1 | 6/2002 | Swanberg |
| 2002/0077182 A1 | 6/2002 | Swanberg |
| 2005/0266907 A1 | 12/2005 | Weston |

(Continued)

OTHER PUBLICATIONS

"Pirates 3 DS game downloads free at US Disney parks", http://www.gamerfell.com/gaming/comment/pirates-3-ds-game-downloads-free-at-usdisney-parks/ (1 page).

(Continued)

*Primary Examiner* — Seng Heng Lim
(74) *Attorney, Agent, or Firm* — Esplin & Associates, PC (57) ABSTRACT

Embodiments of the invention broadly contemplate a location based rewards distribution system. Various embodiments of the invention provide rewards, for example video game unlock codes, based on a user physically visiting a specific physical location.

20 Claims, 4 Drawing Sheets

(56) References Cited

U.S. PATENT DOCUMENTS

2006/0246985 A1 11/2006 Walker
2007/0243934 A1 10/2007 Little

OTHER PUBLICATIONS

"Pirates of the Caribbean Fans With a Nintendo DS can Search for Hidden Treasure at Disney Parks", www.gamershell.com, May 22, 2007 (1 page).
Cortez, Hector, "Exclusive Pirates of the Caribbean DS content at Disneyland", Gaming News, May 21, 2007 (8 pages).

LOCATION BASED REWARD DISTRIBUTION SYSTEM

BACKGROUND

Rewards systems are popular among merchants and consumers. For example, players of video games utilize "cheats" or unlock codes to gain access to a wide variety of extra/bonus features/content within games. These cheats or unlocks are usually given by a code that is manually typed in or otherwise require some manual entry methodology. Once a player is given such a cheat or unlock code/solution, it can easily be spread to other players via a variety of communication types, including voice, posting to Internet web sites, and the like.

BRIEF SUMMARY

Aspects of the invention provide systems, methods, apparatuses and program products providing one or more rewards to consumers in a controlled way, such that consumers are prevented from sharing or publicly disseminating the rewards. Various embodiments of the invention tie distribution of rewards to visits to one or more physical locations.

Various embodiments of the invention use rewards to encourage consumers to interface between two worlds or venues in which entertainment experiences take place. According to various embodiments of the invention, consumers are provided with a connection between these two worlds, namely the physical world, such as a theme park, cruise ship and the like, and the virtual or gaming world, where consumers take part in one or more video game experiences. Embodiments of the invention tie these worlds together by providing one or more physical locations in which the gaming world presents itself to the consumers. The consumers, utilizing embodiments of the invention, are then enabled to interface with the gaming world at these physical locations with a physical token, which when presented at the physical location, earns the consumer one or more rewards. According to embodiments of the invention, a variety of different awards are provided.

In summary, one aspect of the invention provides a system comprising: one or more processors; and one or more modules executable by the one or more processors, the one or more modules comprising: a reader module connected with one or more gaming system components, the reader module being configured to ascertain a physical token has been physically presented at a predetermined physical location; and a provider module configured to provide a reward in response to the physical token being physically presented.

Another aspect of the invention provides a method comprising: utilizing a reader connected to one or more gaming system components to ascertain a physical token has been physically presented at a predetermined physical location; and utilizing a provider module to provide a reward in response to the physical token being physically presented.

A further aspect of the invention provides a computer program product comprising: a computer readable storage medium having computer readable program code embodied therewith, the computer readable program code comprising: computer readable program code configured to utilize a reader connected to one or more gaming system components to ascertain a physical token has been physically presented at a predetermined physical location; and computer readable program code configured to utilize a provider module to provide a reward in response to the physical token being physically presented.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected presently preferred embodiments of the invention as claimed herein.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that while various non-limiting and exemplary embodiments of the invention are described herein in connection with systems, methods and apparatuses distributing game reward(s) to video game player(s), it will be readily understood that various other embodiments can be utilized for different implementations and these embodiments of the invention are considered to fall within the scope and spirit of the disclosure. For example, the reward(s) may include customer points redeemable for merchandise, discounts and the like in addition to the described, exemplary game reward(s). Moreover, the gaming rewards may come in a wide variety, for example rewards which unlock additional content for one player, rewards that unlock additional content for more than one player, rewards that unlock additional content in a gaming-system wide manner (for example for a Multi-player online game), rewards that unlock additional content for a predetermined amount of time, rewards that when combined unlock different combinations of additional content, and the like.

The description now turns to a non-limiting and exemplary embodiment of the invention dealing with gaming rewards which is consistent with the embodiments of the invention, as claimed. The inventors have recognized that it is popular for game developers to provide game cheats or unlock codes (which for the purposes of this non-limiting disclosure are referred to as game "benefit(s)" or "reward(s)") to players in order to enhance the gaming experience, as for example by unlocking additional game features not provided in a default game setting. One difficulty with such game rewards is that when a player learns of a reward unlock code, it is common for that player to share the reward unlock code in an unrestricted way with other players. While this has some positive aspects, for example making the reward available to many players and enhancing their gaming experience, the inventors have recognized that it also has certain drawbacks, including making the game rewards less valuable. For example, if a game reward is freely sharable between players, game developers (and the like) can not utilize the game reward to drive certain behavior, such as when the reward is to be utilized as part of a promotion or customer rewards program benefiting players that have visited a specific, predetermined location and/or participated in a particular event at the predetermined location and/or time.

Accordingly, embodiments of the invention provide a system in which a player is not able to freely share the game reward(s) with other players. Embodiments of the invention require players wishing to obtain a game reward to perform some predetermined action, for example physically going to a specific location with a physical token/device. The device is read/associated with the physical location visit, and a code or cheat (that is, a game reward of some sort) is transmitted to the physical token (device) or to a back end system (networked server or the like) for storage and later retrieval by the player.

The choice of device/reader combinations is selectable and can be configured to accommodate a desired scenario. For example, the device (token) can be a toy configured with an RFID device embedded therein such that upon coming in close proximity to the reader, for example an RFID reader, the reader reads the device (token) to obtain a unique device identification and the user is credited with visiting the physical location. Alternatively, it will be understood by those having skill in the art that the token could be a cellular phone or similar mobile device (with appropriately configured hardware/software) or the combination could be as simple as a bar code/bar code reader combination.

Figure 1:
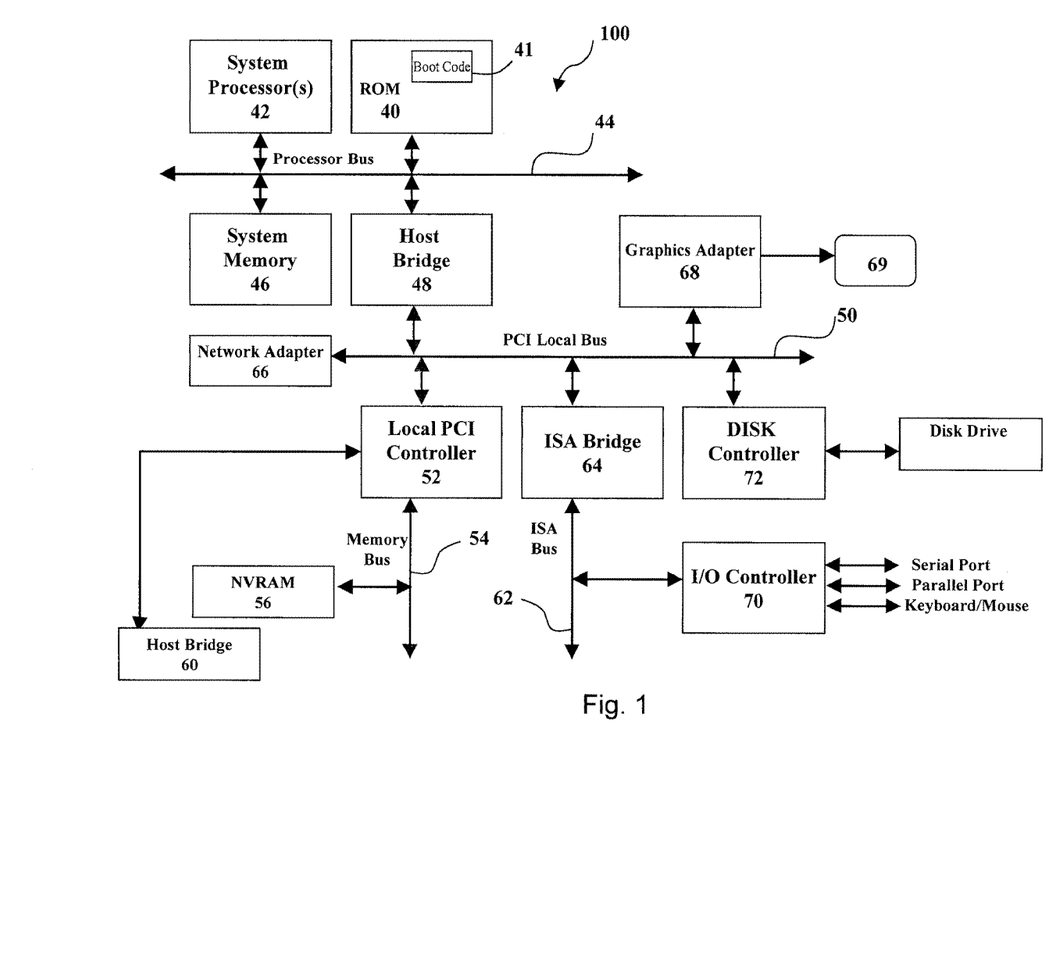
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a desktop or workstation computer, a laptop computer, a smart phone, a mobile computing device and the like. As is apparent from the description, however, the embodiments of the invention may be implemented in any appropriately configured electronic device or computing system, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, etc. A disk controller 72 connects a disk drive with PCI local bus 50. The USB Bus and USB Controller (not shown) are part of the Local PCI controller (52).

Figure 2:
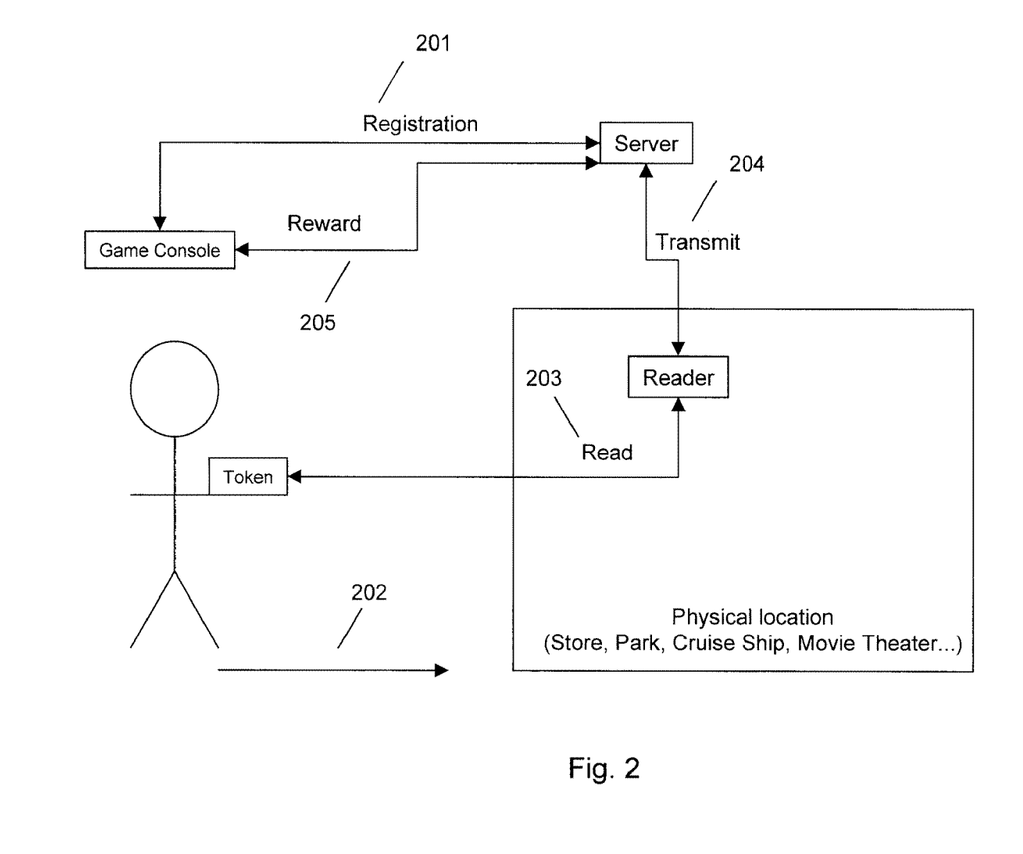
FIG. 2 illustrates an exemplary system and method for location driven reward distribution.

Referring now to FIG. 2, a non-limiting and exemplary method and system for location driven reward distribution according to an embodiment of the invention are illustrated. According to an embodiment of the invention, a user purchases a physical token (token and device are used interchangeably herein) associated in some way with a game. The device may be associated with the game, for example, by selling the game and/or the device and associating them prior to the purchase. In the case where the game and the device have been pre-associated, many such associations can be utilized. For example, a specific set of toys (having devices therein) could be pre-associated with one or more games such that, as described further herein, upon the device being appropriately utilized by the consumer, one or more rewards are distributed for the one or more pre-associated games. Naturally, the pre-association is manageable and can be modified such that different devices and games and combinations thereof can be associated as desired.

The device(s) also are associated (registered) with one or more user accounts and/or gaming systems. These associations can take place prior to physical presentation of the device to the system or thereafter (as described herein). Some non-limiting examples are as follows. The devices could be pre-registered with a user account. In such a scenario, the user registers the device with their user account (in a back end system associated with the game) before attempting to obtain a reward, that is, physically presenting the device to the system. This association can be accomplished simply by having the user update their online account manually or can take the form of an automatic update, such as association of the device purchase with user-identifying information (for example, a loyalty card presented at the time of purchase). Naturally, a user account and/or a physical token can be associated with multiple games. If registration occurs after the physical presentation of the device to the system, the user can obtain the reward by having their account information matched with a device identification having the reward associated therewith. In any event, the device/user association is registered at 201. In this example, the user may register the device at 201 in their online game account prior to physically presenting it, thus associating the device and game with the user via the online account.

Once the user has obtained the device (registered or not), the user is prepared to obtain unlock reward(s) associated with the game. According to embodiments of the invention, to unlock the reward(s), the user is required to physically visit a predetermined location (or locations) at 202. According to embodiments of the invention, the physical location is a physical manifestation of the virtual or gaming world, as discussed herein. That is, the physical location presents the user with an interface to the gaming world via the physical location. The physical location can be pre-selected or pre-determined, as desired. For example, the physical location can be one or more of a store, a park, a cruise ship, a movie theater and the like. Virtually any physical location that would be desirable to have game players visit may be selected as the physical location. Preferably, the physical location has some relation to the game to which the one or more rewards pertain.

The user brings the device (token) to the physical location in order to unlock the reward(s) at 202. At the physical location, a reader is configured to read the player's device at 203. According to embodiments of the invention, the reader thus presents the user with a physical interface with the gaming world, as the reader is in fact part of a gaming system.

According to an embodiment of the invention, in response to reading the token at 203, the reader transmits (for example via a provider module) the read data (identification information) to a back end system (for example, a server that is network connected to the reader) at 204. Thus, information recording the user's visit to the physical location is automatically logged with the back end system at 204. The user can then continue on with the visit to the physical location and engage in whatever other activities he or she desires.

Importantly, the back end system is part of a gaming world. For example, the back end system may include a server hosting one or more multi-player online games and/or user accounts. The reward(s) thus transmitted may therefore collect at the server, awaiting redemption by the user that has physically presented the token when next he or she plays the game.

Thus, sometime thereafter the user may wish to utilize the reward for use in the gaming experience. Accordingly, the server is configured to transmit the reward to a predetermined location, for example the gaming console, at 205. This transmission may be automatic and virtually contemporaneous with the reader reading the token or can be in response to another action, for example the user logging into his or her online account. As will be understood by those having ordinary skill in the art, different games may utilize different reward types and/or different redemption schemes.

In any event, the specific user having the token is credited with a reward usable in the game to unlock an enhanced gaming experience via visiting the physical location. Preferably the reward(s) are automatically applied to the game such that manual entry of codes is not required. Moreover, it is preferred that the reward(s) (for example, unlock codes) are not visible/ascertainable to the user such that they can not be freely exchanged outside the system.

Figure 3:
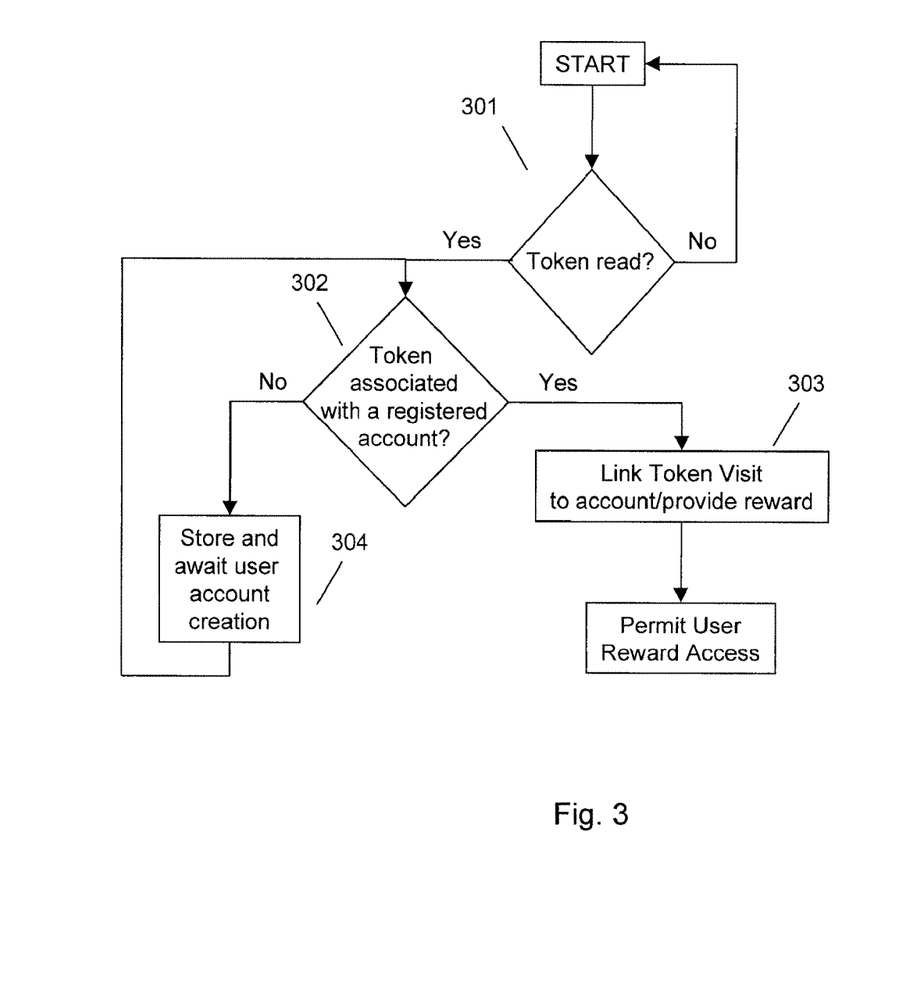
FIG. 3 illustrates an exemplary method for location driven reward distribution.

Referring to FIG. 3, a non-limiting and exemplary method for location driven reward distribution is illustrated. As shown, the reader determines if a token is read at 301, which as discussed herein comprises physically associating the token with the physical location in some way. In response to determining that the token is read at 301, it is determined if the token is associated with a user account at 302. This determination can be made in a variety of locations, for example, this determination can be made at a back end server of the system having stored therein or accessible thereto user account information.

In response to determining at 302 that the token is associated with a user account (for example pre-registered with an online gaming account), the token visit is linked to the account at 303. The token visit information thus linked to the account unlocks one or more game rewards that can be automatically applied to the account and/or transmitted to a linked gaming console or can be stored for later retrieval by the user having access to the online gaming account.

If it is determined that the token has not been registered with a user account, the system preferably stores the physical location visit information at 304 for later reward retrieval. This would correspond, for example, to use case where a user that has just purchased the game/token, visited a physical location having a reader, but has not yet had a chance to establish/update an account. Thus, in response to the user establishing/updating an account having the token associated therewith, the visit can be properly credited and the one or more rewards distributed.

Figure 4:
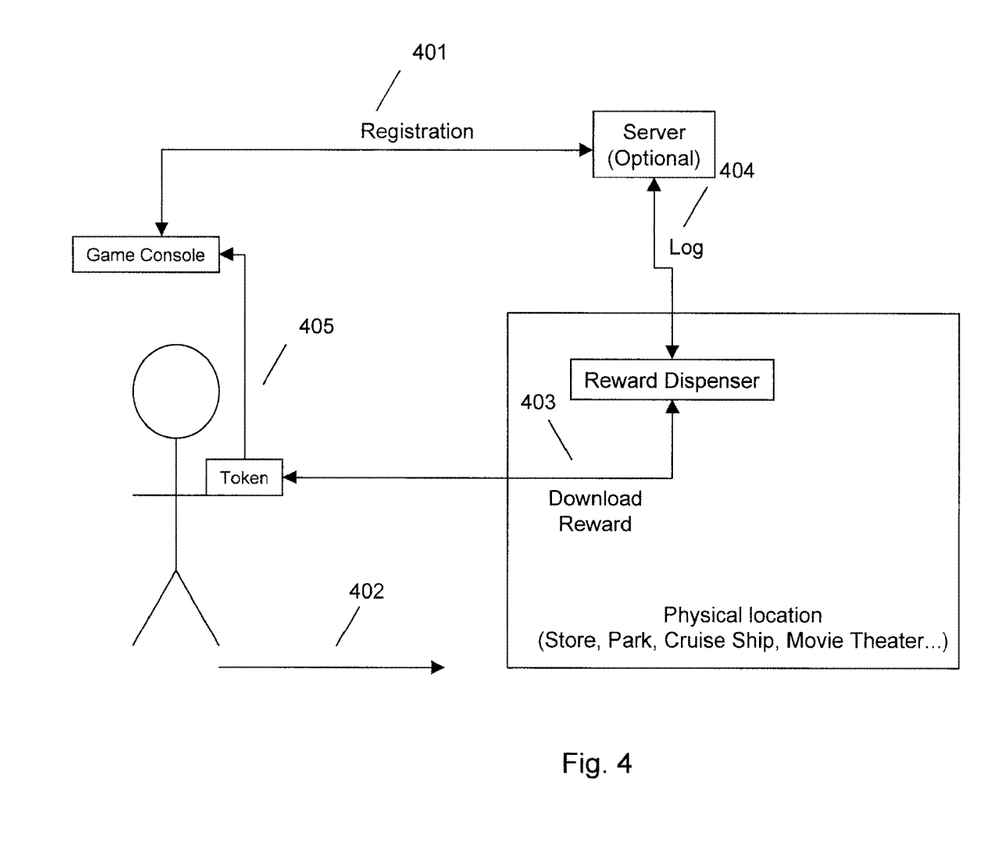
FIG. 4 illustrates an exemplary system and method for location drive reward distribution.

Referring to FIG. 4, another non-limiting and exemplary location driven reward distribution method and system are illustrated. Here, the user again may establish an online gaming account at 401 (which as discussed herein could occur before or after physical location visit information capturing). The user in this scenario has a device, such as a USB storage device or the like (which may or may not be purchased along with a game or a set of games), capable of storing game reward(s). At 402 the user makes a visit to the physical location having a reward dispenser.

At 403 the user can download the reward from the on-site dispenser to the storage device. Again, those with ordinary skill in the art will recognize that so long as the visit to the physical location is accomplished, the distribution of the reward(s) can be modified (e.g. wireless download to another type of device, such as a cell phone or smart phone). In response to the user downloading the reward at 403, the reward dispenser can optionally log the visit information with the back end system at 404. While logging the visit is not necessary to allow reward distribution in this case, it may be useful for a variety of other purposes (for example tracking visits by game users to physical location(s)). At 405 the user can upload the reward to the game console, for example by plugging in the USB storage device or utilizing wireless transmission.

According to various embodiments of the invention, one or more rewards can be distributed in a variety of different ways to a variety of different users for a variety of different purposes. For example, users may be rewarded based on the "quality" of their visits. As a non-limiting example, a user visiting a movie theater may be given a level 1 reward; whereas a user visiting a cruise ship may be given a level 5 reward, where the level 5 reward unlocks significantly more game features/benefits than the level 1 reward. Moreover, certain patterns or combinations, either temporal or geographical, of user physical location visits can be rewarded in different ways. As such, it will be appreciated by those having ordinary skill in the art that embodiments of the invention provide for driving physical location visits based on the gaming rewards offered.

It should be understood that various embodiments of the invention provide reward(s) to users based on visit(s) to physical location(s). While the non-limiting and exemplary embodiments discussed herein have focused on specific types of rewards and specific types of physical location visits, where users make use of specific devices, apparatuses and systems to obtain the rewards, and specific devices, apparatuses and systems are used to distribute the rewards, the discussion presented herein is not intended to so limit the scope of the claimed embodiments of the invention.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system configured to provide location-based rewards for users of a virtual world, the system comprising:
   one or more physical processors configured by machine-readable instructions to:
      store user accounts for the users of the virtual world in a virtual world server, the users utilizing physical tokens to obtain rewards in the virtual world, individual physical tokens having individual unique identifications, the virtual world being accessible to individual users via individual user devices, a first user account associated with a first user including:
         a first unique identification of a first physical token, the first unique identification providing an association of the first physical token with the first user account;
         an association of a first user device with the first user account; and
         one or more rewards credited to the first user account; and
      responsive to obtaining indications of the individual physical tokens being physically present at one or more physical locations, transmit individual rewards to the individual user devices for storage on the individual user devices and credit the individual user accounts stored in the virtual world server with the individual rewards, the individual rewards being accessible to the individual users from the individual user devices storing the individual rewards and the individual user accounts to which the individual rewards are credited, such that responsive to obtaining a first indication of the first physical token being physically present at a first physical location a first reward is transmitted to, and stored on, the first user device and the first user account is credited with the first reward.

2. The system of claim 1, wherein the one or more physical processors are further configured by machine-readable instructions such that:
   a requirement to transmit individual rewards to the individual user devices for storage on the individual user devices and to credit the individual user accounts stored in the virtual world server with the individual rewards includes making a positive determination that the individual physical tokens are associated with the individual user accounts, such that:
      responsive to obtaining the first indication and determining that the first physical token is associated with the first user account, perform the transmission of the first reward to the first user device and the crediting of the first user account with the first reward; and
      responsive to obtaining a second indication of a second physical token being physically present at the first physical location and determining that the second physical token is not associated with the first user account, store a second reward in the virtual world server without transmitting the second reward to the first user device or crediting the first user account with the second reward.

3. The system of claim 2, wherein the one or more physical processors are further configured by machine-readable instructions to:
   responsive to determining that individual physical tokens are associated with the individual user accounts, transmit individual rewards not previously transmitted to individual user devices and credit individual user accounts not previously credited with the individual rewards, such that:
      responsive to subsequently determining the second physical token is associated with the first user account, transmit the second reward to the first user device and credit the first user account with the second reward.

4. The system of claim 1, further comprising the individual RFID readers located at individual ones of the one or more physical locations.

5. The system of claim 1, wherein transmitting the individual rewards for storage on the individual user devices comprises transmitting via a network connection.

6. The system of claim 5, further comprising:
   one or more reward dispensers storing rewards, individual reward dispensers being located at individual ones of the one or more physical locations; and
   wherein transmitting the individual rewards for storage on the individual user devices comprises transmitting the individual rewards from the individual reward dispensers to the individual user devices via the network connection.

7. The system of claim 1, wherein the first reward is available for immediate retrieval via the first user device responsive to the transmission of the first reward for storage on the first user device.

8. The system of claim 1, wherein the first user account includes the first unique identification of the first physical token responsive to registration of the first physical token with the first user account.

9. The system of claim 1, wherein the individual rewards are not visible and/or ascertainable to the individual users such that the individual rewards cannot be freely exchanged between users.

10. The system of claim 1, wherein the individual rewards are unlock codes.

11. A method to provide location-based rewards for users of a virtual world, the method being implemented in a system comprising one or more physical processors configured by machine-readable instructions, the method comprising:
   storing user accounts for the users of the virtual world in a virtual world server, the users utilizing physical tokens to obtain rewards in the virtual world, individual physical tokens having individual unique identifications, the virtual world being accessible to individual users via individual user devices, a first user account associated with a first user including:
      a first unique identification of a first physical token, the first unique identification providing an association of the first physical token with the first user account;
      an association of a first user device with the first user account; and
      one or more rewards credited to the first user account; and responsive to obtaining indications of the individual physical tokens being physically present at one or more physical locations, transmitting individual rewards to the individual user devices for storage on the individual user devices and crediting the individual user accounts stored in the virtual world server with the individual rewards, the individual rewards being accessible to the individual users from the individual user devices storing the individual rewards and the individual user accounts to which the individual rewards are credited, such that responsive to obtaining a first indication of the first physical token being physically present at a first physical location a first reward is transmitted to, and stored on, the first user device and the first user account is credited with the first reward.

12. The method of claim 11, wherein a requirement to transmit individual rewards to the individual user devices for storage on the individual user devices and to credit the individual user accounts stored in the virtual world server with the individual rewards includes making a positive determination that the individual physical tokens are associated with the individual user accounts, the method further comprising:

responsive to obtaining the first indication and determining that the first physical token is associated with the first user account, performing the transmission of the first reward to the first user device and the crediting of the first user account with the first reward; and responsive to obtaining a second indication of a second physical token being physically present at the first physical location and determining that the second physical token is not associated with the first user account, storing a second reward in the virtual world server without transmitting the second reward to the first user device or crediting the first user account with the second reward.

13. The method of claim 12, further comprising:

responsive to determining that individual physical tokens are associated with the individual user accounts, transmitting individual rewards not previously transmitted to individual user devices and crediting individual user accounts not previously credited with the individual rewards, such that:

responsive to subsequently determining the second physical token is associated with the first user account, transmitting the second reward to the first user device and credit the first user account with the second reward.

14. The method of claim 11, wherein the system implementing the method further includes the individual RFID readers located at individual ones of the one or more physical locations.

15. The method of claim 11, wherein transmitting the individual rewards for storage on the individual user devices comprises transmitting via a network connection.

16. The method of claim 15, further comprising:

transmitting the individual rewards from individual reward dispensers to the individual user devices via the network connection, the individual reward dispensers being located at individual ones of the one or more physical locations.

17. The method of claim 11, wherein the first reward is available for immediate retrieval via the first user device responsive to the transmission of the first reward for storage on the first user device.

18. The method of claim 11, wherein the first user account includes the first unique identification of the first physical token responsive to registration of the first physical token with the first user account.

19. The method of claim 11, wherein the individual rewards are not visible and/or ascertainable to the individual users such that the individual rewards cannot be freely exchanged between users.

20. The method of claim 11, wherein the individual rewards are unlock codes.

* * * * *